US008475749B2

(12) United States Patent
Kralik et al.

(10) Patent No.: US 8,475,749 B2
(45) Date of Patent: Jul. 2, 2013

(54) PROCESS FOR RECOVERY OF NOBLE METALS FROM FUNCTIONALISED, NOBLE METAL-CONTAINING ADSORPTION MATERIALS

(75) Inventors: Joachim Kralik, Hanau (DE); Martin Stettner, Altenstadt (DE); Stefanie Fuchs Alameda, Biebergemünd (DE)

(73) Assignee: Heraeus Precious Metals GmbH & Co. KG, Hanau (DE)

( * ) Notice: Subject to any disclaimer, the term of this patent is extended or adjusted under 35 U.S.C. 154(b) by 0 days.

(21) Appl. No.: 13/421,441

(22) Filed: Mar. 15, 2012

(65) Prior Publication Data

US 2012/0237417 A1 Sep. 20, 2012

(30) Foreign Application Priority Data

Mar. 18, 2011 (DE) .......................... 10 2011 014 505

(51) Int. Cl.
*C22B 11/00* (2006.01)
(52) U.S. Cl.
USPC .................. 423/22; 423/27; 75/419; 75/420; 75/421; 75/426
(58) Field of Classification Search
USPC ........... 423/22, 27–41; 75/416–423, 426–428
See application file for complete search history.

(56) References Cited

U.S. PATENT DOCUMENTS

| 3,632,336 | A | 1/1972 | Cameron et al. |
| 4,360,380 | A | 11/1982 | Zarur |
| 6,579,504 | B1 * | 6/2003 | Liddell ........................... 423/22 |
| 2004/0026329 | A1 | 2/2004 | Ekman et al. |
| 2008/0295749 | A1 | 12/2008 | Nowottny et al. |
| 2010/0290962 | A1 | 11/2010 | Wilson et al. |

FOREIGN PATENT DOCUMENTS

| CN | 1 067 925 A | 1/1993 |
| DE | 20 36 841 A1 | 2/1971 |
| DE | 60108157 T2 | 12/2005 |
| EP | 0 304 231 A2 | 2/1989 |
| EP | 1 321 534 A2 | 6/2003 |
| EP | 1576200 A1 | 9/2005 |
| GB | 2 269 376 A | 2/1994 |
| GB | 2 358 874 A | 8/2001 |
| WO | WO 2004050926 A1 | 6/2004 |
| WO | WO 2004090178 A1 | 10/2004 |
| WO | WO 2006/013060 A1 | 2/2006 |
| WO | WO 2007036334 A2 | 4/2007 |

OTHER PUBLICATIONS

European Search Report dated Jun. 4, 2012.
Kramer et al. Recovery of rhodium-containing catalysts by silica-based chelating ion exchangers containing N and S donor atoms, Inorganica Chimica Acta (2001), vol. 315(2), pp. 183-190).

* cited by examiner

*Primary Examiner* — Steven Bos
(74) *Attorney, Agent, or Firm* — Norris McLaughlin & Marcus, P.A.

(57) ABSTRACT

A method recovers noble metals from noble metal-containing compositions and includes steps of (i) providing a noble metal-containing composition containing an adsorption agent that is based on an inorganic material and is functionalized by organic groups and has at least one noble metal adsorbed to it, and (ii) ashing of the noble metal-containing composition provided in step (i) in order to adjust a residual carbon content of at most 10% by weight, relative to the total weight of the noble metal-containing composition after ashing, to obtain an ashed composition.

14 Claims, No Drawings

PROCESS FOR RECOVERY OF NOBLE METALS FROM FUNCTIONALISED, NOBLE METAL-CONTAINING ADSORPTION MATERIALS

The invention relates to a method for recovery of noble metals from noble metal-containing compositions.

In numerous industrial processes, noble metal-containing residues are obtained, whose noble metal content is sufficiently high to warrant recovery in an economically reasonable manner. Said residues are, for example, slurries, skimmings, polishing dusts, production residues from industrial plants containing noble metal-containing catalyst residues, and the like.

Numerous methods are known for recovering the noble metal contained in compositions. One method that is used very commonly and also features very high efficiency, is the so-called cyanide leaching, which is used, in particular, in the recovery of gold. In this context, sodium or potassium cyanide leach is added to gold-containing compositions, whereby the gold and, to some extent, other noble metals contained therein are dissolved in the leach. In the case of gold, the gold is bound in a complex in ionic form in aqueous solution. In a second procedural step, the gold can then be electrolytically deposited from the solution. Said method works very well from a technical point of view, but is associated with a crucial disadvantage in that large quantities of highly poisonous cyanides need to be handled which is extremely problematic for reasons of environmental protection and health protection of the persons tasked with this work.

In order to circumvent this problem, attempts have been made to side-step this by using other complex-forming agents, such as, for example, thiourea. However, doing so is associated, in particular, with a problem in that the surfaces of the metal particles to be dissolved are passivated rapidly through the formation of colloidal sulphur which reduces the efficiency of the method drastically. Methods involving the use of thiourea as complex-forming agent have therefore thus far failed to attain economic significance in industrial metal recycling methods.

Another approach to the recovery of noble metals, which has been described, for example, in WO-A-2006/013060, is the use of so-called scavenger materials. Frequently, silica gel- or aluminium oxide gel-based inorganic materials are used that are functionalised by organic complex-forming agents and adsorb the noble metals upon being contacted with noble metal-containing solutions. The adsorbed noble metals are then isolated further from the recyclable goods thus obtained. The first step of the isolation of noble metals from said recyclable goods is the dissolution thereof. Referring to the use of silica gel-based scavenger materials, direct leaching through treatment with oxidising acids, such as is described, for example, in EP-A-1 576 200 or U.S. Pat. No. 4,360,380, is not sufficiently effective for quantitative removal of the adsorbed noble metals owing to the high silica gel content. Substantial quantities of noble metal remain on the carrier and cannot be dissolved easily. Treatment of the recyclable goods with complex-forming agents, such as thiourea, also leads to only partial elution of the noble metals adsorbed to silica gel (cf. "*Recovery of rhodium-containing catalysts by silica-based chelating ion exchangers containing N and S donor atoms*", Kramer et al., Inorganica Chimica Acta (2001), vol. 315(2), pages 183-190).

The present invention was based on the object to overcome the disadvantages resulting from the prior art regarding the separation of noble metals from scavenger materials functionalised by organic groups, in particular from silica gel- or aluminium oxide gel-based inorganic materials functionalised by complex-forming agents.

In particular, the present invention was based on the object to specify a method for separation of noble metals from said scavenger materials enabling more efficient separation of the noble metals as compared to the methods known according to the prior art.

A contribution to meeting the afore-mentioned objects is made by a method for recovering noble metals from noble metal-containing compositions that includes the procedural steps:

i) providing a noble metal-containing composition containing an adsorption agent that is based on an inorganic material and is functionalised by organic groups and has at least one noble metal adsorbed to it;

ii) ashing of the noble metal-containing composition provided in procedural step i) in order to adjust a residual carbon content of at most 10% by weight, particularly preferably of at most 5% by weight, even more preferably of at most 3.5% by weight, and most preferably of at most 2.0% by weight, each relative to the total weight of the noble metal-containing composition after ashing, to obtain an ashed composition;

iii) at least partial dissolution of the ashed composition obtained in procedural step ii) in an alkaline aqueous solution to obtain a noble metal-containing residue;

iv) at least partial dissolution of the noble metal-containing residue obtained in procedural step iii) in an oxidising aqueous acid to obtain an aqueous salt solution of the noble metal;

v) recovering, if applicable, the noble metal through reduction of the noble metal salt obtained in procedural step iv).

Procedural step i) of the method according to the invention involves initially providing a noble metal-containing composition containing an adsorption agent that is based on an inorganic material and is functionalised by organic groups and which has at least one noble metal adsorbed to it.

Conceivable as functionalised adsorption agents that are based on an inorganic material are all materials known to the person skilled in the art that are customarily used as scavenger materials in the recovery of noble metals from industrial residues. Preferably, said materials are inorganic gels, which preferably are based on silicon oxides or aluminium oxides. Particularly preferred adsorption agents are those that are based on a silica gel or an aluminium oxide gel, whereby the use of an adsorption agent based on a silica gel is particularly preferred. In this context, silica gels functionalised by sulphur- and/or nitrogen-containing organic groups are particularly preferred, with silica gels that are functionalised by thiol or sulfide groups being particularly preferred in this context.

Examples for suitable silica gels that are functionalised by organic groups are, for example, the functionalised silica gels that are commercially available from Biotage AG, Sweden, by the trade name of ISOLUTE®. Said silica gels are, for example, a silica gel functionalised by 2,4,6-trimercaptotriazine groups (ISOLUTE® SI-TMT), a silica gel functionalised by carbonate groups (ISOLUTE® SI-Carbonate), a silica gel functionalised by thiol groups, for example with 1-propanethiol groups (ISOLUTE® SI-Thiol), a silica gel functionalised by triamine groups, for example with 3-(diethylenetriamine)propyl groups (ISOLUTE® SI-Triamine) or a silica gel functionalised by sulfonic acid groups, for example a silica gel functionalised by ethylbenzenesulfonylhydrazine groups (ISOLUTE® SI-Tosyl Hydrazine), with methylbenzenesulfonic acid groups (ISOLUTE® SI-TsOH) or with propylsulfonic acid groups (ISOLUTE® SI-Propylsulfonic acid). Also to be mentioned are those functionalised silica gels that are commercially available, for example, by the trade name of SilicaBond®, PhosphonicS™ or QuadraSil™. Of the scavenger materials that are commercially available by the trade name of PhosphonicS™, in particular the silica gels functionalised by N-acetyl-L-cysteine groups (article number 16-0200), the silica gels functionalised by 2-aminoethylsulfide-ethyl groups (article number 16-0215), the silica gels functionalised by 2-mercaptoethylethylsulfide groups (article number 16-0650), the silica gels functionalised by 3-mercaptopropylethylsulfide groups (article number 16-1700, 16-1706, 16-1702, and 16-1704), the silica gels functionalised by pentaerythritol-2-mercaptoacetate-ethylsulfide groups (article number 16-1540), and the silica gels functionalised by triamine-ethylsulfideamide groups (article number 16-0210) are preferred.

Functionalised silica gel materials of this type are usually available as a particulate solid that is based on at least 50% by weight, particularly preferably on at least 75% by weight, even more preferably on at least 90% by weight, and most preferably on 100% by weight, each relative to the functionalised silica gel material that is used, on particles having a particle size in a range from 100 to 1,000 µm, particularly preferably 200 to 800 µm, and most preferably 300 to 600 µm.

It is customary for said adsorption agents that are based on an inorganic material, in particular such adsorption agents based on silica gel, to be functionalised by 0.1 to 10 mmol/g, particularly preferably by 0.25 to 5 mmol/g, and most preferably by 0.5 to 1.5 mmol/g organic groups.

The adsorption agent that is contained in the composition provided in procedural step i) and is based on an inorganic material and is functionalised by organic groups, preferably the silica gels described above that are functionalised by organic groups, have at least one noble metal adsorbed to them, whereby it is preferred that the noble metal-containing composition provided in procedural step i) contains at least 0.5% by weight, particularly preferably at least 1.0% by weight, and most preferably at least 1.5% by weight of the noble metal, each relative to the total weight of the noble metal-containing composition provided in procedural step i). As a matter of principle, noble metal-containing compositions containing up to 10% by weight or more of the noble metal can be used in the method according to the invention. In this context, it is also preferred that the noble metal-containing composition provided in procedural step i) contains at least 25% by weight, particularly preferably at least 30% by weight, and most preferably at least 35% by weight of $SiO_2$, each relative to the total weight of the noble metal-containing composition provided in procedural step i).

Preferably, the noble metal-containing composition provided in procedural step i) can be obtained by contacting a noble metal-containing residue, from which the noble metal is to be recovered, and an adsorption agent that is functionalised by organic groups and based on an inorganic material, preferably by contacting a noble metal-containing residue and a silica gel functionalised by organic groups. Conceivable noble metals are, for example, gold, platinum, iridium, palladium, osmium, silver, mercury, polonium, ruthenium, rhodium, copper, bismuth, technetium, rhenium, and antimony, whereby gold, platinum, iridium, palladium, osmium, silver, ruthenium, rhodium, copper, bismuth, technetium, rhenium are particularly preferred and platinum and rhodium are most preferred.

The noble metal-containing residue from which the noble metal is to be recovered can, for example, be an effluent water from a mine or from an electroplating or metallurgical operation. Also conceivable are production residues of organic synthesis processes, in which noble metal-containing catalysts are used and in which at least part of the catalyst material reaches the product phase during the course of the organic synthesis. In order to adsorb the noble metals through scavenger materials from noble metal-containing residues of this type, the usually particulate materials are contacted with the noble metal-containing residues, which are preferably present in the form of a liquid phase, whereby said contacting preferably proceeds at a temperature in a range from 60 to 120° C., particularly preferably at a temperature in a range from 80 to 100° C. This can be effected, for example, by adding the scavenger materials to the residues while stirring and separating them from the residue after a certain contacting time, which usually is in a range from 5 minutes to 5 hours, particularly preferably in a range from 30 minutes to 2.5 hours, and during which the mixture of the noble metal-containing residue and the scavenger material is being stirred. Separating the scavenger material, which is now noble metal-loaded, from the residue can proceed, for example, through filtration, sedimentation or centrifugation processes. Moreover, it is conceivable and preferred according to the invention to provide the scavenger material in a column and run the noble metal-containing residue through the column. This is another means of loading the noble metals onto the scavenger material.

Usually, the noble metal-containing composition provided in procedural step i) contains, aside from the noble metal-loaded adsorption agent, organic materials from the aforementioned residues, whereby the quantity of said organic materials can be in a range from 10 to 50% by weight, in particular in a range from 20 to 40% by weight, each relative to the total weight of the noble metal-containing composition provided in procedural step i).

In procedural step ii) of the method according to the invention, the noble metal-containing composition provided in procedural step i) is ashed in order to obtain an ashed composition in order to adjust a residual carbon content of at most 10% by weight, particularly preferably of at most 5% by weight, even more preferably of at most 3.5% by weight, and most preferably of at most 2.0% by weight, each relative to the total weight of the noble metal-containing composition after ashing. In this ashing process, in the course of which at least part of the functional groups of the adsorption agent and part of the other organic material that may be present in the composition are removed, the loss on ignition attained preferably is at least 40% by weight, particularly preferably is at least 45% by weight, and most preferably is at least 50% by weight.

The ashing in procedural step ii) preferably proceeds at a temperature of at least 500° C., particularly preferably of more than 700° C., and most preferably of at least 800° C. for a period of preferably at least 2 hours, more preferably of at least 4 hours, even more preferably of at least 6 hours, and particularly preferably of at least 10 hours. It is customary to carry out the ashing in an air atmosphere. Preferably, a temperature of 1,200° C., particularly preferably of 1,100° C., and most preferably of 1,000° C., is not exceeded in the ashing.

Ashing the noble metal-containing composition in procedural step ii) can just as well include two or more steps, if applicable, such as is described, for example, in WO 2007/036334. In this context, the noble metal-containing composition can, for example, be heated in a first step in a nitrogen atmosphere or an air atmosphere under the afore-mentioned temperature conditions and for the afore-mentioned period of time in order to remove a first part of the functional groups of the adsorption agent and a first part of the further organic materials that may also be present in the composition. Subsequently, further heating, possibly after re-mixing the partially ashed material, if applicable, preferably further heating under the afore-mentioned temperature conditions and for the afore-mentioned period of time, can be effected in order to further reduce the carbon content. Said further heating preferably proceeds in the presence of oxygen, particularly preferably in an air atmosphere. Said two-step procedure allows the ashing to be implemented in a particularly efficient manner.

Then, in procedural step iii) of the method according to the invention, the ashed composition obtained in procedural step ii) is dissolved, at least in part, in an alkaline aqueous solution to obtain a noble metal-containing residue. In this procedural step, mainly the inorganic materials, on which the inorganic material provided in procedural step i) was based, i.e. preferably the silica gel, are dissolved, at least in part. Preferably, said dissolution proceeds in that the ashed composition is mixed with the aqueous alkaline solution, preferably with an aqueous NaOH or KOH solution, particularly preferably with an aqueous NaOH solution, and the resulting mixture is then heated, under pressure if applicable, to a temperature in a range from 50 to 300° C., particularly preferably 70 to 200° C., for a period of time in a range from 30 minutes to 10 hours, particularly preferably in a range from 1.5 to 8.5 hours.

The concentration of the aqueous alkaline solution that is used is preferably at least 10% by weight, even more preferably at least 15% by weight, and most preferably at least 20% by weight, whereby the concentration usually is in a range from 20 to 55% by weight, each relative to the total weight of the alkaline aqueous solution used in procedural step iii).

In this context, it is particularly preferred that the at least partial dissolution of the ashed composition obtained in procedural step ii) in the alkaline aqueous solution proceeds in the presence of a reducing agent in procedural step iii). Adding a reducing agent during dissolution can prevent the noble metal from becoming dissolved at this early point in time.

The reducing agent preferably is an organic reducing agent, hydrazine or hydrogen gas, whereby preferred organic reducing agents are selected from the group consisting of formic acid or a formic acid salt, formaldehyde, alcohols (for example methanol or ethanol), ascorbic acid, glucose, gluconic acid, ascorbic acid, and oxalic acid.

The quantity of reducing agent used in procedural step iii) can be in a range from 1 mg to 2,500 mg per gram of ashed adsorption agent, particularly preferably in a range from 5 mg to 1,000 mg per gram of ashed adsorption agent, and most preferably in a range from 10 mg to 100 mg per gram of ashed composition. The reducing agent concentration in the alkaline aqueous solution used in procedural step iii) can be in a range from 0.1 to 10% by weight, particularly preferably in a range from 0.5 to 5% by weight, each relative to the total weight of the alkaline aqueous solution used in procedural step iii).

Further additives can be added to the alkaline aqueous solution aside from the reducing agent, whereby in particular the addition of settling agents is preferred provided the separation of the noble metal-containing residue is intended to be effected through sedimentation, during which the alkaline aqueous solution is separated by decanting from the noble metal-containing residue.

After dissolution of the ashed adsorption agent in the manner described above, the noble metal-containing residue thus obtained can be separated from the solution, for example, through filtration, sedimentation or centrifugation, but preferably through sedimentation, and fed to the next procedural step iv) after washing with water or aqueous solution, if applicable. If the noble metal-containing is to be separated through filtration through the use of filter paper, it can prove to be advantageous to provide for an additional procedural step, in order to remove the filter paper, prior to carrying out procedural step iv).

In procedural step iv), the noble metal-containing residue is then dissolved ("leached"), at least in part, in an oxidising aqueous acid, preferably in an aqueous solution of the chloride salt of the noble metal, and an aqueous salt solution of the noble metal is obtained. In particular in the case of rhodium being the noble metal to be recovered, it can also prove to be advantageous to further reduce the noble metal-containing residue obtained in procedural step iii) prior to procedural step iv), whereby said reduction preferably proceeds in a hydrogen stream. The reduction in a hydrogen stream preferably proceeds at temperatures in a range from 200 to 600° C., particularly preferably in a range from 300 to 500° C., for a period of time of 1 to 24 hours, particularly preferably 4 to 10 hours.

The at least partial dissolution of the noble metal-containing residue obtained in procedural step iii) in an oxidising aqueous acid to obtain an aqueous salt solution of the noble metal in procedural step iv) preferably proceeds in nitric acid, in a mixture containing hydrochloric acid and nitric acid, for example in aqua regia, or in hydrochloric acid containing an oxidant, for example in hydrochloric acid containing chlorine gas or in hydrochloric acid containing chlorate. The dissolution of the noble metal-containing residue in the oxidising acid preferably proceeds at a temperature in a range from 30 to 200° C., particularly preferably in a range from 60 to 100° C. The acid concentration of the acid employed in procedural step iv) preferably is at least 10% by weight, particularly preferably at least 20% by weight, and most preferably at least 30% by weight, each relative to the total weight of the oxidising aqueous acid employed in procedural step iv).

If applicable, the noble metal can then be recovered in procedural step v) of the method according to the invention from the noble metal salt obtained in procedural step iv). Said recovery can proceed in a manner known to the person skilled in the art, for example through reduction of the noble metal salt obtained in procedural step iv), for example through electrolysis. Preferably, the noble metals are obtained at a purity of at least 90%, particularly preferably at least 95%, and most preferably at least 99% in this context.

Usually, a person skilled in the art will attempt to obtain low liquid volumes with the lowest possible noble metal concentrations.

If, e.g., the amount of water or the amount of sodium hydroxide solution, in grams, in step iii) is approximately ten- to fifteen-fold the mass of the residue that is to be treated and contains, e.g., 1 to 5% by weight of the noble metal, it is generally feasible to obtain a solution over the noble metal-containing residue with very low noble metal concentrations of <5 mg/l or even <1 mg/l. This is evident, e.g., from the examples 2 to 4 below. Further processing of said solutions is usually not economical and they may be discarded.

Generally, the total mass of the loaded scavenger that is employed is observed to be reduced by more than 90%, in particular more than 95%, after step iii), which means that the noble metal content of the residue can be increased by up to 20-fold.

The invention shall be illustrated in more detail in the following based on non-limiting examples.

EXAMPLES

Example 1

56.9 g scavenger (the PhosphonicS™ 16-0650 product made by Strem Chemicals, Inc., USA, was used) loaded with 1.60% by weight rhodium and unspecified left-over residues of an organic process residue from a homogeneous catalytic process were ignited at 800° C. in an air atmosphere for 8 h in order to remove all organic components. A total of 25.5 g of the silica gel-containing ash were obtained, which corresponds to a loss on ignition of 55%. The residual carbon content was 1.6%, the Rh content was analysed to be 3.56% (0.91 g).

Example 2

Using a pressurised autoclave, 25 g of a rhodium-containing ash obtained analogous to example 1 were heated to 180° C. for 4 h in the presence of 250 ml 45% sodium hydroxide solution and 1 g sodium formate. The sample was then allowed to cool down and the supernatant solution was decanted. The supernatant solution contained <1 mg/l Rh. The residue on the Nutsch filter was washed with water and dried. The concentrated residue was analysed to weigh 0.5 g.

Example 3

Using a pressurised autoclave, 18.5 g of a rhodium-containing ash obtained analogous to example 1 were heated to 180° C. for 8 h in the presence of 185 ml 45% NaOH solution and 1 g sodium formate. The sample was then allowed to cool down and the supernatant solution was decanted. The supernatant solution contained <1 mg/l Rh. The residue on the Nutsch filter was washed with water and dried. The concentrated residue was analysed to weigh 3.8 g.

Example 4

A total of 25.5 g of a rhodium-containing ash obtained analogous to example 1 were added to 350 ml 31% NaOH solution and, after adding 14 ml 22% hydrazine solution in the form of individual drops, the sample was heated in an open container to 80° C. for 3 h. Then, 50 to 100 ml water and 20 ml settling agent (Praestol®, acrylic acid and acrylamide copolymer, Ashland Deutschland GmbH) were added, the sample was allowed to settle and then decanted off the residue. The residue was filtered and washed with water; its mass was 2 g after drying. The decanted solution contained 3 mg/l rhodium and was therefore discarded.

Example 5

The residue from example 4 was reduced for 7 h at 400° C. in a stream of hydrogen and then leached in an apparatus for 15 hours at 60° C. in 32% hydrochloric acid by introducing chlorine gas. During this period, the rhodium-containing hydrochloric acid was replaced once by fresh 32% hydrochloric acid. The Rh content of the combined hydrochloric acid solution was determined by ICP to be 0.91 g Rh.

Example 6

94.9 g scavenger (the PhosphonicS™ 16-1700 product made by Strem Chemicals, Inc., USA, was used) loaded with platinum and unspecified left-overs of an organic process residue from a homogeneous catalytic silicone production process were ignited at 800° C. in an air atmosphere for 8 h in order to remove all organic components. A total of 48.0 g of the silica gel-containing ash were obtained, which corresponds to a loss on ignition of 49%. The residual carbon content was 200 ppm, the Pt content was analysed to be 1.10% (0.528 g).

Example 7

A total of 20.1 g of a platinum-containing ash obtained analogous to example 6 were heated to 80° C. for 4 h in an open container in the presence of 270 ml 31% NaOH solution and 4 ml formic acid. Subsequently, the suspension was cooled to 60° C. and filtered. After washing with water, 1.35 g of residue were obtained. No platinum was detected in the alkaline filtrate by means of ICP.

Example 8

The residue from example 7 was leached at 80 to 100° C. in 600 ml aqua regia and the Pt content was determined by means of ICP: 0.22 g.

Example 9

A total of 20.2 g of a platinum-containing ash obtained analogous to example 6 were heated to 80° C. for 3 h in an open container in the presence of 270 ml 31% NaOH solution and 9 ml 22% hydrazine. Subsequently, the suspension was cooled to 60° C. and filtered. After washing with water, 1.41 g of residue were obtained. No platinum was detected in the alkaline filtrate by means of ICP.

Example 10

The residue from example 7 was leached at 80 to 100° C. in 600 ml aqua regia and the Pt content was determined by means of ICP: 0.22 g.

The invention claimed is:
1. A method for recovery of noble metals from noble metal-containing compositions, the method comprising the steps of:
  i) providing a noble metal-containing composition containing an adsorption agent, comprising an inorganic material and functionalized by organic groups; and having at least one noble metal adsorbed to the absorption agent;
  ii) ashing of the noble metal-containing composition to adjust a residual carbon content to at most 10% by weight, relative to the total weight of the noble metal-containing composition after ashing, to obtain an ashed composition;
  iii) at least partial dissolution of the ashed composition in an alkaline aqueous solution to obtain a noble metal-containing residue;
  iv) at least partial dissolution of the noble metal-containing residue in an oxidizing aqueous acid to obtain an aqueous salt solution of the noble metal; and
  v) optionally, recovering the noble metal through reduction of the noble metal salt solution.
2. The method according to claim 1, wherein the adsorption agent is a silica gel- or an aluminium oxide gel-based adsorption agent.
3. The method according to claim 1, wherein the adsorption agent is functionalized by 0.1 to 1.5 mmol/g organic groups.
4. The method according to claim 1, wherein the noble metal-containing composition contains at least 0.5% by weight of noble metal, relative to the total weight of the noble metal-containing composition.
5. The method according to claim 1, wherein the noble metal-containing composition is obtained by contacting a noble metal-containing residue and an adsorption agent that is functionalized by organic groups and based on an inorganic material.

6. The method according to claim 1, wherein the ashing of the noble metal-containing composition proceeds at a temperature above 700° C.

7. The method according to claim 6, wherein the ashing of the noble metal-containing composition proceeds for a period of time of at least two hours.

8. The method according to claim 1, wherein the at least partial dissolution of the ashed composition in an alkaline aqueous solution to obtain a noble metal-containing residue proceeds in the presence of a reducing agent.

9. The method according to claim 8, wherein the reducing agent is an organic reducing agent, hydrazine or hydrogen gas.

10. The method according to claim 9, wherein the organic reducing agent is selected from the group consisting of formic acid, a formic acid salt, formaldehyde, alcohols, ascorbic acid, glucose, gluconic acid, and oxalic acid.

11. The method according to claim 1, wherein the noble metal-containing residue is reduced in a hydrogen stream prior to step iv).

12. The method according to claim 1, wherein the noble metal-containing residue loses by more than 90% total mass as compared to the material in step i).

13. The method according to claim 12, wherein the loss of total mass exceeds 95%.

14. The method according to claim 1, wherein the at least partial dissolution of the noble metal-containing residue in an oxidizing aqueous acid to obtain an aqueous salt solution of the noble metal proceeds in nitric acid, in a mixture containing hydrochloric acid and nitric acid, in hydrochloric acid containing chlorine gas or in hydrochloric acid containing chlorate.

* * * * *